United States Patent [19]

Wenzel

[11] 4,305,739
[45] Dec. 15, 1981

[54] URANIUM ENRICHMENT APPARATUS OF THE SEPARATING-NOZZLE TYPE

[75] Inventor: Werner Wenzel, Essen, Fed. Rep. of Germany

[73] Assignee: Nustep, Trenndüsen Entwicklungs- und Patentverwertungs-Gesellschaft mbH & Co. KG, Essen, Fed. Rep. of Germany

[21] Appl. No.: 102,331

[22] Filed: Dec. 11, 1979

[30] Foreign Application Priority Data

Jan. 20, 1979 [DE] Fed. Rep. of Germany ....... 2902214

[51] Int. Cl.³ .......................................... B01D 59/18
[52] U.S. Cl. ...................................... 55/269; 55/17; 55/343; 55/478; 55/DIG.14
[58] Field of Search ................... 55/17, 269, 342, 343, 55/478, DIG. 14

[56] References Cited

U.S. PATENT DOCUMENTS

| | | | |
|---|---|---|---|
| 3,277,631 | 10/1966 | Sonnen | 55/17 |
| 3,835,918 | 9/1974 | Pilarczyk | 55/269 |
| 4,033,021 | 7/1977 | Tybus et al. | 55/17 |
| 4,093,436 | 6/1978 | Wenzel | 55/269 |
| 4,118,205 | 10/1978 | Wang | 55/17 |
| 4,193,775 | 3/1980 | Wang | 55/17 |

FOREIGN PATENT DOCUMENTS

| | | |
|---|---|---|
| 536992 | 4/1955 | Belgium ............................. 55/269 |
| 1052955 | 11/1959 | Fed. Rep. of Germany . |
| 1091541 | 4/1961 | Fed. Rep. of Germany . |
| 2542296 | 3/1977 | Fed. Rep. of Germany . |
| 2741461 | 4/1979 | Fed. Rep. of Germany . |

Primary Examiner—David L. Lacey
Attorney, Agent, or Firm—Karl F. Ross

[57] ABSTRACT

An apparatus for isotope separation by the separating-nozzle process has a horizontally disposed cylindrical housing in which a multistage radial compressor is received, the compressor being surrounded by the cooling units and separating-nozzle units of the various stages connected in cascade. The system is extremely compact and has high efficiency because it is free from excessively long flow paths.

10 Claims, 7 Drawing Figures

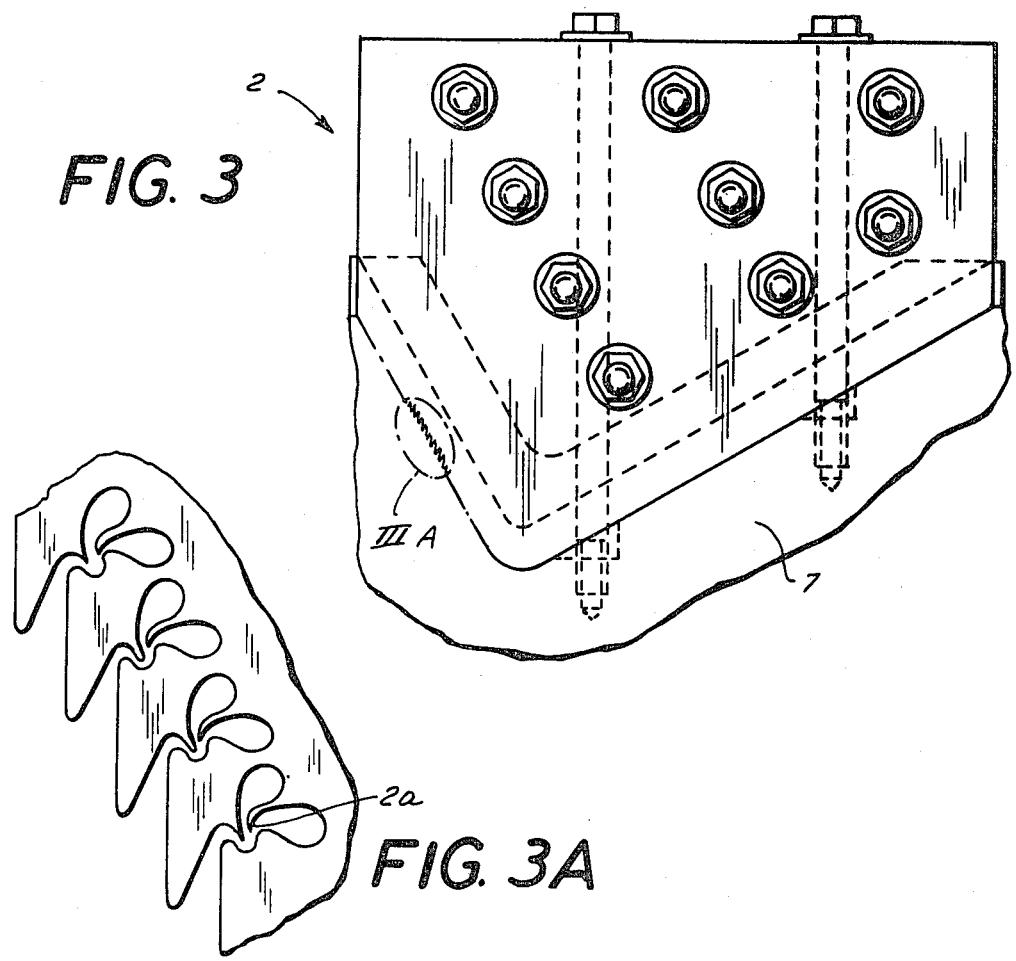
FIG. 3
FIG. 3A
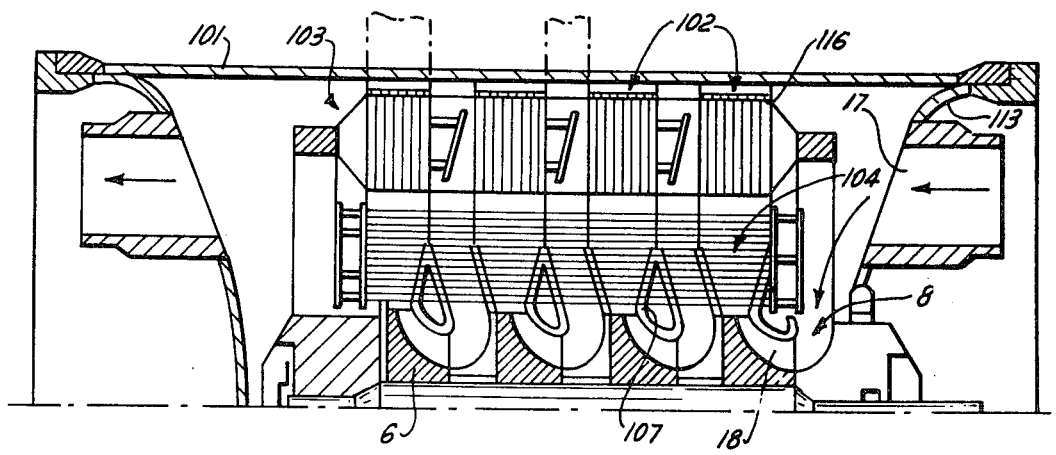
FIG. 4

URANIUM ENRICHMENT APPARATUS OF THE SEPARATING-NOZZLE TYPE

CROSS REFERENCE TO RELATED APPLICATIONS

This application is related to the commonly assigned copending applications Ser. No. 888,974 and Ser. No. 928,436 filed Mar. 22, 1978 and July 27, 1978 (now U.S. Pat. Nos. 4,209,309 and 4,222,752, respectively), respectively, the first being related in turn to an application Ser. No. 725,493 of Sept. 22, 1976 (now U.S. Pat. No. 4,093,436).

FIELD OF THE INVENTION

The present invention relates to an apparatus for carrying out isotope separation by the separating-nozzle process and, more particularly, to an improved uranium-enriching apparatus.

BACKGROUND OF THE INVENTION

The separation of isotopes in the gas phase and, especially, uranium isotopes for uranium enrichment, based upon different molecular weights, different kinetic cross sections of the molecules of the isotopes to be separated in the gas phase, or like differences in physical properties of the gaseous compounds of the two isotopes, can be effected by a separating-nozzle process well documented in the literature and described, inter alia, in the aforementioned copending applications and patent, the publications mentioned in the specifications thereof, and in the references applied or made of record therein including, for example, German Pat. Nos. 1,052,955, 1,091,541, 1,794,174 and 2,542,296 and the German application No. P 27 41 461 corresponding to application Ser. No. 928,436. Attention may also be directed to the references cited in these cases.

In the separating-nozzle process, the gas mixture, e.g. uranium hexafluoride containing uranium isotopes to be separated, is forced with or without a carrier (e.g. low molecular weight gas) through slit-like nozzles, the outflow of which is intercepted by skimmer-diaphragm arrangements defining an opening between the two skimmers. The molecules of the higher isotope preferentially pass into the opening while the molecules of lower molecular weight component of the mixture tend to bypass the opening as a result of the outward diffusion of these molecules in the jet.

Apart from the references mentioned above, separating-nozzle systems, their structural and operating principles and the compressors and like auxiliary devices used with them can be found in U.S. Pat. No. 3,362,131, U.S. Pat. No. 3,708,964, U.S. Pat. No. 3,877,892, German Pat. No. 2,031,678 and publications:

Chemie-Ingenieur-Technik, Vol. 29, p. 364 ff. (1957);
Chemie Ingenieur Technik, Vol. 39, p. 1 ff. (1967);
Atomwirtschaft/Atemtechnik, Vol. 13, p. 359 ff. (1968).

In applicant's early work in this field, in part described in the above-mentioned applications and publications, efforts were made to provide compact systems for carrying out separating-nozzle process in cascade so as to maximize isotope separation.

In general, the earlier apparatuses from which the present developments derive, had a cylindrical housing or vessel, separating-nozzle units connected in a separating cascade resulting in a gradual enrichment of at least one component of the gas mixture in at least one of the uranium isotopes, respective coolers associated with the separating-nozzle units, e.g. compression heat and compressor aggregates which provided at least one compressor stage for each stage of the cascade.

In addition to these elements, the apparatus included gas passages connecting the various units and efforts were made to provide the most compact configuration of the structure within the constraints that the separating-nozzle units, coolers and the ducts connecting same were provided generally within the housing while the compressor and their associated parts were disposed externally of the housing.

The compressor had the role of displacing the gas mixture and forcing the same through the nozzles in jets with the lighter component diffusing outwardly bypassing the collecting opening or slit.

The coolers served to maintain a generally constant temperature in the region of the separating-nozzle units and ducts were provided for passing separated fractions in opposite directions in cascade to afford greater enrichment of at least one of the fractions in its specific isotope.

In the system of Ser. No. 928,436, the radial compressors were disposed outside the housing and below the latter with the separating-nozzle units having vertically arranged nozzles disposed above respective coolers. This system had the advantage that the compressors were readily accessible from the exterior and the pipe to and from the compressor could be relatively simple. The interior units, such as the separating-nozzle units, were readily accessible for maintenance and monitoring.

However, while this system was highly effective, it had the disadvantage that the apparatus occupied more space than was desirable. Furthermore, the gas passages to and from the compressor and even in the housing were relatively long so that thermodynamic disadvantages arose which reduced the efficiency.

Similar disadvantages characterize the system of the German patent document No. 25 42 296 and U.S. Pat. No. 4,093,436 in spite of the fact that the compressors were disposed within the housing in this arrangement.

OBJECTS OF THE INVENTION

It is the principal object of the present invention to provide an improved apparatus for carrying out a separating-nozzle process, e.g. of uranium enrichment whereby the above-mentioned disadvantages are obviated.

Another object is to provide a construction of the separating-nozzle units, coolers and radial compressors such that the volume is minimal and the efficiency is increased.

SUMMARY OF THE INVENTION

These objects and others which will become apparent hereinafter are attained, in accordance with the invention, by providing a cylindrical housing having a horizontal axis along which the radial compressor is disposed coaxially, the compressor being surrounded by the separating-nozzle units and the cooler units in a coaxial array. The cylindrical housing wall is formed with at least one maintenance opening affording access to these units and one or both ends of the housing can be closed by a removable cover to allow axial withdrawal of the compressor or either or both of a heat exchanger unit formed by the coolers and a cascade unit formed by the separating-nozzle units.

Thus both units and the compressor lie symmetrically about the axis of the housing so that the total assembly is compact and the passages connecting the various units are short.

The interior of the housing contains practically no unused space, nor are there any locations at which especially high pressure losses or energy drops can develop. For a given specific volume (output per unit volume) the separating efficiency and the energy efficiency are therefore increased.

One or more windows provided as described in the cylindrical shell afford access for maintenance of the various components, especially when at least the outermost unit is formed with a shaft (maintenance shaft) aligned or alignable with the window and through which access can be afforded to an inner unit. The housing can be provided with fittings for pipe connections at these access openings or independently thereof.

Radial compressors, e.g. multistage compressors with multistage rotors, generally are provided at their outlet sides with diffusers. According to one aspect of the invention, the individual diffuser elements of the radial compressors perform the additional function of carrying or constituting the heat exchanger elements of the cooler or the separating-nozzle assemblies of the separating-nozzle units or stages.

In other words, the radial compressor need not be provided with a special diffuser since the diffuser function may be taken over in whole or in part by the cooler of the separating-nozzle stage.

For example, the coolers can form a structural unit which can be connected to the diffusers or which can form them and, upon disconnection of the pipes or tubes of the heat exchanger from the coolant supply and discharge lines, the heat exchanger unit can be removed axially through one end of the housing upon the removal of a cover at this end.

One or more of the coolers or this heat exchanger unit can be provided with the maintenance shaft which preferably extends over the entire axial length of the cooler or heat exchanger.

When the separating-nozzle units are disposed in or on the diffuser elements or are formed by the diffuser elements, the coolers or heat exchanger can be provided around the separating-nozzle units. This allows the tubes of the heat exchanger to be straight and extend the length of the heat exchanger.

According to another feature of this invention, the coolers are built into the individual diffuser units and are surrounded radially by the separating-nozzle units held together, for example, by a basket construction and advantageously connected axially to form a structure which can be removed as upon the opening of an end of the housing. The separating-nozzle units can thus form an integral cascade which can be rotatable about the housing axis for aligning parts of the cascade with one or more maintenance openings in the housing wall.

Naturally, the radial compressors can have the usual diffuser structures, advantageously of a radial compact design. When the coolers form a unitary heat exchanger the diffuser stages can carry it and the separating-nozzle units can be united in addition with one or both of the parts being rotatable and axially removable.

BRIEF DESCRIPTION OF THE DRAWING

The above and other objects, features and advantages of the present invention will become more readily apparent from the following description, reference being made to the accompanying drawing in which:

FIG. 3 is a detail view of a portion III of the structure shown in FIG. 2, drawn to an enlarged scale;

FIG. 3A is a further enlarged detail of the region IIIA of FIG. 3;

FIG. 4 is a partial axial cross section corresponding to FIG. 1 but illustrating another embodiment of the invention;

SPECIFIC DESCRIPTION

Figure 1:
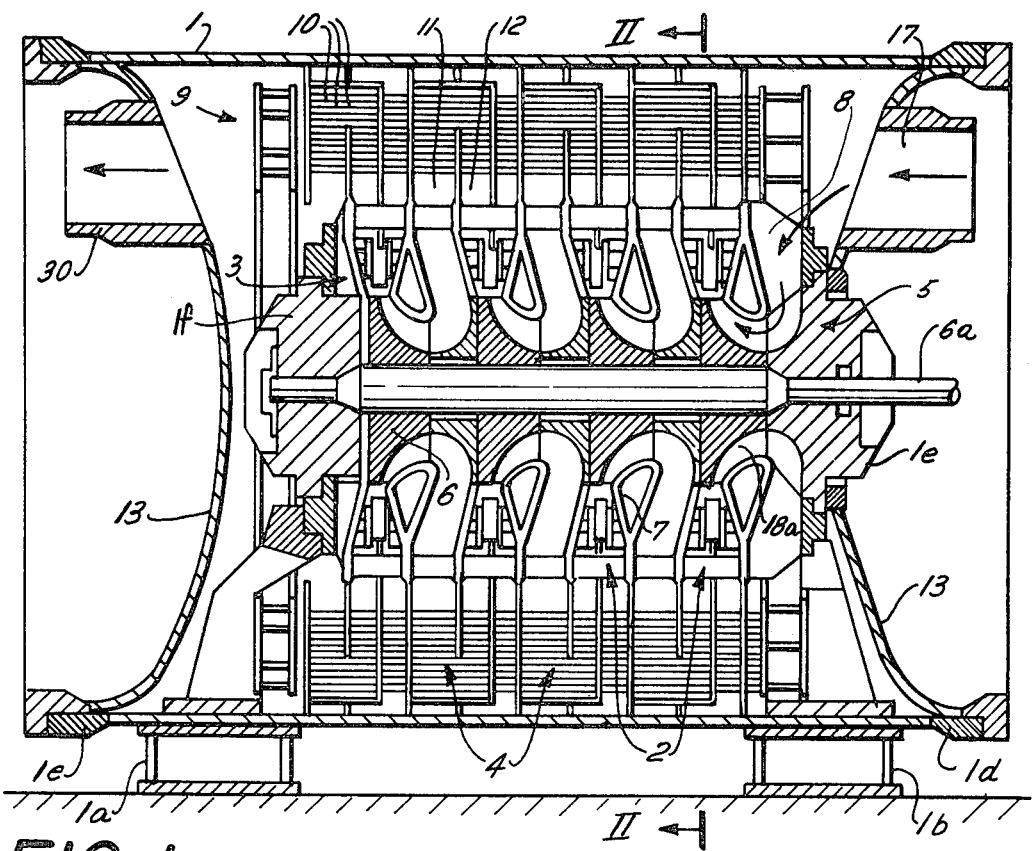
FIG. 1 is a diagrammatic axial cross-sectional view through a uranium enrichment apparatus operating by the separating-nozzle process in accordance with the present invention.
Figure 2:
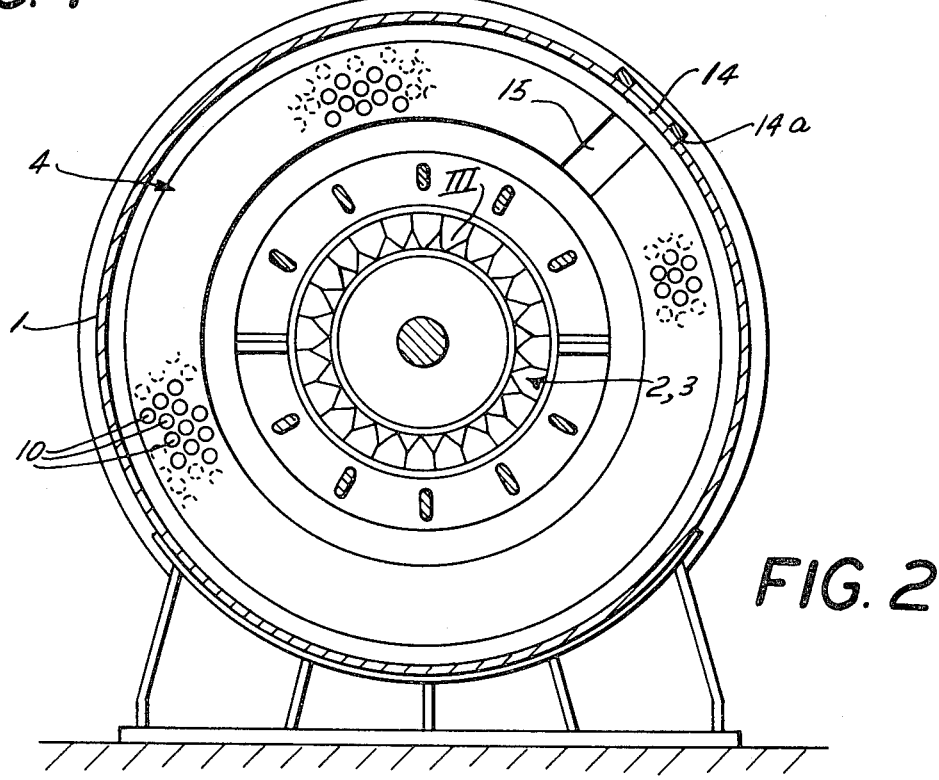
FIG. 2 is a cross-sectional view taken along the line II—II of FIG. 1.

The apparatus shown in FIGS. 1–3 is a unit for the separation of uranium isotopes in the form of a mixture of gaseous compounds of these isotopes by the separating-nozzle process, i.e. utilizing the principles of the separating-nozzle publications mentioned previously. In this process, as noted, a compressor increases the pressure of a gas mixture of the isotopes and, after cooling to remove compression heat, feeds the gas mixture to a multiplicity of nozzles in each stage of cascade. The jets from these nozzles are each trained at a narrow slit-like opening in which a portion of each jet, slightly enriched in the heavier isotope, is collected, the remaining portion of each jet bypassing the opening. By the cascade connection of the stages, the enrichment in the heavier and lighter isotopes of the two gas fractions, i.e. collected in the slot and that bypassing the slot, respectively, is increased. The heat exchanger or cooler of each stage ensures that the gas supply to the separating-nozzle unit, i.e. for each stage, is at a given temperature.

In the embodiment shown in FIGS. 1–3, a cylindrical vessel having a horizontal axis, is mounted upon supports $1a$, $1b$ and is provided with thickened ends $1c$, $1d$, to which the flanges of a pair of inwardly domed covers 13 are affixed by bolts, clamps or other removable fastening elements conventional in the flange-connection art.

The vessel 1 receives a multiplicity of separating-nozzle units 2 forming respective stages of a multistage cascade 3 connected as described in the aforementioned patents. Each of the assemblies of separating-nozzle units 2 forming a given stage is associated with a cooler 4.

The compressor 5 is a multichannel or multistage radial compressor with a multichannel or multistage rotor 6 and respective diffuser members 7, the number of stages of the compressor and its rotor corresponding to the number of stages of the cascade.

According to the invention, each stage, including the associated separating-nozzle units 2, cooler 4 and stage of the compressor 5 lie in a common radial plane perpendicular to the axis of the compressor.

The several stages of the rotor 6 are mounted on a common shaft 6a which is journaled in bearings 1e and 1f of the plates 13 and can be driven by an electric motor not shown.

Reference to a multichannel or multistage radial compressor is intended to mean that a plurality of discrete compressor units are provided in axially stacked relationship for displacement by a common shaft as shown.

The system is provided with gas ducts, one of which has been shown at 8, within the housing for connecting the various units in the cascade relationship described.

By comparing the axis cross section of FIG. 1 with the radial cross section of FIG. 2, it can be seen that the radial compressor 5 is disposed centrally within and coaxial with the cylindrical vessel 1 while the coolers 4 and the separating cascade 3 are concentrically disposed around the compressor 5.

The cylindrical vessel 1 is also formed with manholes 14 which can be closed by sealing covers 14a aligned with or associated with maintenance shafts 15 to allow access to the various interior components and repair or maintenance thereof, i.e. removal and replacement of the separating-nozzle units.

In the Figures to be described subsequently, numerals corresponding to those used above preceded by respective hundreds digits are used to represent similarly functioning parts which to the extent that the respective functions have been described need not be detailed further.

In the embodiment of FIGS. 1–3, the separating-nozzle units 2 are disposed in the individual diffuser elements 7 to which the coolers 4 are connected.

The coolers 4 are connected, e.g. by bolts, in heat exchanger unit 9 which is provided with throughgoing longitudinal parallel heat exchanger tubes 10 with which gas distributors 11 and gas collectors 12 are associated.

This arrangement is so designed that upon removal of at least one of the covers 13 and disconnection of the associated pipes or ducts, the entire heat exchanger 9 can be removed from the housing 1 through the resulting open end thereof. The means, including inlet and outlet pipes, for passing the coolant through the heat exchanger tubes 10 have not been shown and may be any conventional construction utilized in the tube-sheet heat exchanger art.

In addition, or alternatively, the coolers 4 or at least one of the coolers 4, can be accessible through the longitudinally extending maintenance shaft 15 which can extend parallel to the axis of the housing 1 and which is associated with a correspondingly shaped opening 14 in the wall of the housing. The maintenance shaft 15 can also be used to allow internal assembly of the coolers 4 into a single heat exchanger cooler unit or disconnection of individual coolers from the heat exchanger unit 9 for individual removal or replacement.

FIGS. 3 and 3A show how, in the diffuser units, the plate-shaped separating-nozzle elements are provided. The actual separating-nozzle structure is clear from FIG. 3A and can provide the flow splitter 2a against which the stream is directed to subdivide each jet into two components passed in opposite directions in the cascade as previously described.

FIG. 4 shows an embodiment of the invention in which the cooler 104 is disposed in the individual diffuser sections 107 of the compressor when the cooler is connected directly to the separating-nozzle units 102. In this case, the separating-nozzle units 102 are held by a basket structure 116 in a cascade unit 103 which can be axially removed from the housing 101 upon the removal of the cover 113. The separating cascade 103 can, of course, be rotatable about the axis of the housing to bring the various parts thereof into an alignment with one or more maintenance openings of the type shown in FIG. 1.

Figure 5:
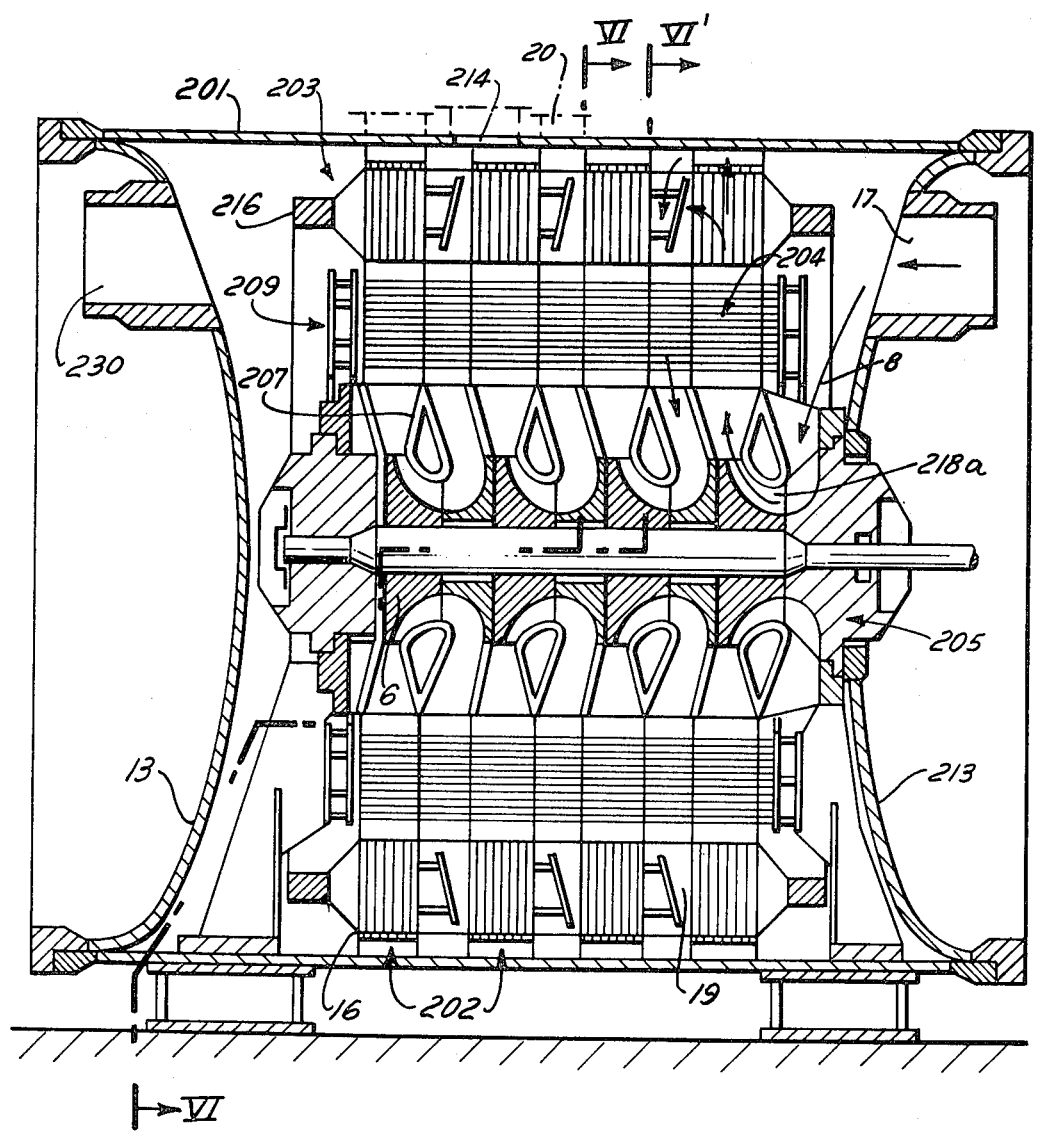
FIG. 5 is an axial section also corresponding to FIG. 1 but representing still another embodiment.
Figure 6:
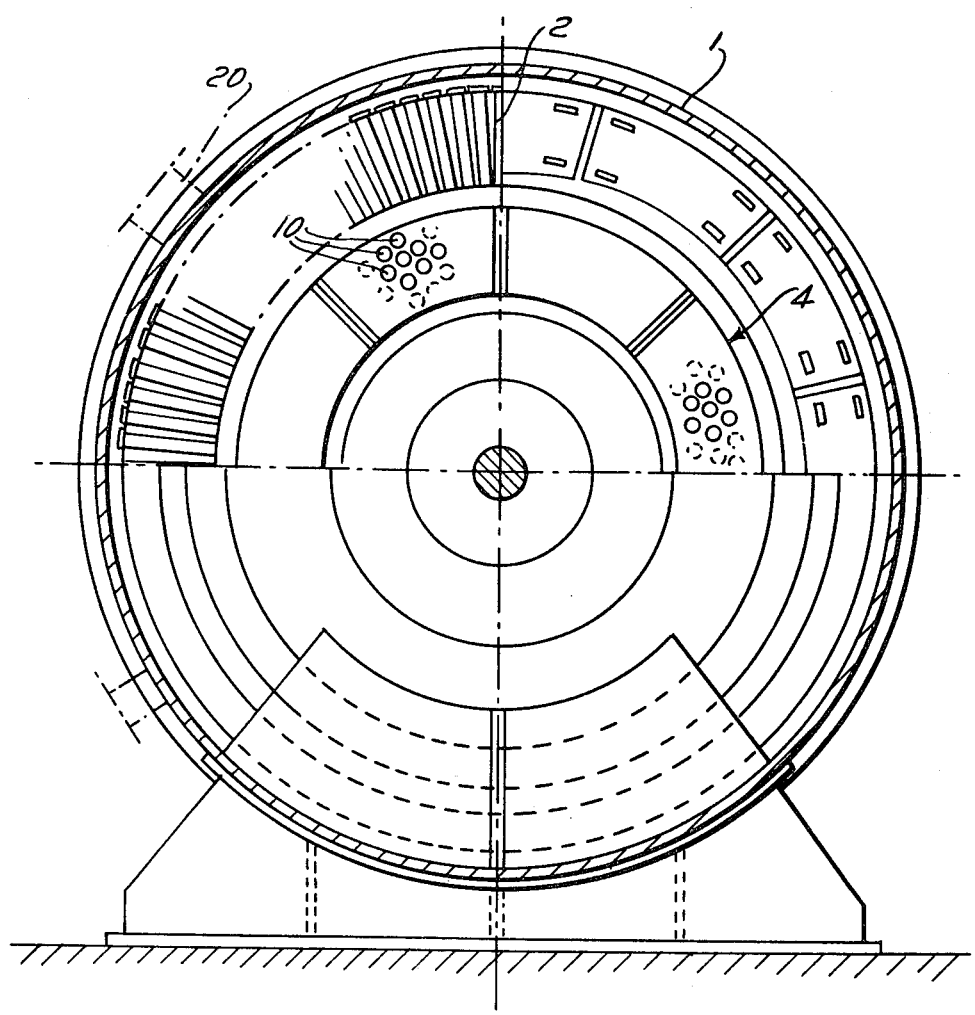
FIG. 6 is a cross-sectional view in part taken along the line VI—VI and in part along the line VI—VI of FIG. 5.

In the embodiment of FIGS. 5 and 6, the coolers 204 form a structural unit represented as the heat exchanger 209 which is mounted upon the elements 207 of the radial compressor 205, the latter functioning as a conventional compressor and the diffuser elements as the customary diffuser at the discharge side of a radial compressor.

Separating-nozzle units 202 are joined by the basket-type frame 216 into a single unit which can be axially shiftable relative to the heat exchanger 209 and/or can be rotatably connected to the heat exchanger 209 to allow the parts of the separating-nozzle units to be aligned with the maintenance openings 214 and/or to be axially withdrawn from the housing 201.

The kinematic reversal of this embodiment is also possible, i.e. the separating-nozzle units 202 can form a single cascade unit 203 which is mounted upon individual diffuser stages 207 of the radial compressor 205, the cascade 203 being then surrounded by a heat-exchanger unit 209 formed by connecting the coolers 204 together. In this case, the coolers 204 can be formed with one or more longitudinally extending maintenance shafts which communicate with maintenance openings or windows in the vessel wall.

In all of the embodiments described the primary maintenance activity is required for the separating-nozzle units 2 which tend to wear and must be replaced from time to time. The symmetry of the apparatus provides a highly compact construction which nevertheless fulfills all of the requirements with respect to the separating-nozzle process with greater efficiency inasmuch as long flow paths and unused space are avoided. Maintenance and monitoring of the state of the structural element is permitted through the manholes and, if desired, connecting pipes can be provided as represented at 20 for the manholes which have flange construction to which external pipes can be connected as may be required.

The gas flow through the system of the present invention is effected in the direction of the arrow.

The input gas mixture is supplied through the inlet fitting 17 in the right-hand cover 13,113, 213, and enters the first compressor 18a, 218a. In the first compressor stage, the gas flows radially outwardly into the associated structural elements, namely, the associated diffuser, cooler and separating-nozzle unit. Within the separating-nozzle sets the gas is enriched in the heavy isotope while the gas flowing by the slits has an increased concentration of the lighter isotope. The heavy fraction is drawn off radially (see FIG. 3) while the lighter fraction is conducted axially and the gas mixture enriched in the heavier isotope is fed to the next compressor stage and so on in the cascade pattern described in the aforementioned applications.

While it is preferred to provide the coolers between the compressor and their separating-nozzle stages, this is not essential, since the coolers can be part of the separating-nozzle stages, or downstream therefrom as required as long as the temperature is maintained substantially constant during the separation.

The gas chambers 19 (see FIG. 5) allow a heavy fraction to be mixed with a lighter fraction from different separations as part of the cascade, resulting in a net increase in the heavy fraction in the component discharged through the outlet 30, 130 or 230.

I claim:

1. An apparatus for the separation-nozzle enrichment in an isotope of a gas mixture, comprising:
    a cylindrical housing having a generally horizontal axis;
    a multistage radial compressor disposed in said housing along said axis;
    a plurality of separating-nozzle units forming respective separating stages operatively connected to and associated with respective stages of said compressor and disposed around said compressor generally coaxial therewith, said separating-nozzle units of said stages being connected in a cascade for progressive enrichment of a gas mixture in an isotope thereof;
    respective coolers operatively connected to and associated with each compressor and each separating-nozzle stage and disposed coaxially around said compressor in said housing;
    means for introducing said gas mixture into said housing for compression in each compressor stage, isotope enrichment in each separating-nozzle stage and cooling in each cooler;
    means for recovering from said housing a gas mixture enriched in said isotope; and
    means forming in the cylindrical wall of said housing at least one maintenance opening affording access to units within said housing including said coolers, said separating-nozzle units and said compressor.

2. The apparatus defined in claim 1 wherein each compressor stage has a respective diffuser, said separating-nozzle units being formed in the respective diffusers and said coolers being mounted on said diffusers.

3. The apparatus defined in claim 2 wherein said coolers are interconnected in a common heat exchanger, said housing having a removable cover at least at one end thereof through which said heat exchanger can be axially withdrawn.

4. The apparatus defined in claim 2 wherein at least one of said coolers is formed with an inwardly extending access shaft registering with said at least one opening for enabling external access to units inwardly of said coolers.

5. The apparatus defined in claim 1 wherein said compressor stages are formed with respective diffusers, the respective coolers being formed in said diffusers, said separating-nozzle units being mounted upon said diffusers radially outwardly thereof.

6. The apparatus defined in claim 5 wherein said separating-nozzle units are connected together in a removable separating cascade body by a basket structure, said housing having a removable cover at least at one end through which said body can be axially withdrawn.

7. The apparatus defined in claim 6 wherein said body is mounted for rotation about said axis in said housing to enable alignment of parts thereof with said at least one opening.

8. The apparatus defined in claim 1 wherein said compressor is formed with diffusers along the outer portion thereof, said coolers are connected in a unitary heat exchanger mounted on said diffusers, and said separating-nozzle units are mounted in a separating cascade body surrounding said heat exchanger and shiftable thereon to enable maintenance and withdrawal.

9. The apparatus defined in claim 1 wherein said separating-nozzle units are joined in a separating cascade body by a basket structure, said coolers being connected in a single heat exchanger surrounding said cascade body, said at least one heat exchanger being formed with a maintenance shaft alignable with said opening and extending substantially the full length of the heat exchanger.

10. The apparatus defined in claim 1 wherein said at least one opening is formed with a fitting pipe enabling a pipe connection therein.

* * * * *